US009749234B2

(12) United States Patent
Tofighbakhsh

(10) Patent No.: US 9,749,234 B2
(45) Date of Patent: *Aug. 29, 2017

(54) SIGNALING-LESS DYNAMIC CALL SETUP AND TEARDOWN BY UTILIZING OBSERVED SESSION STATE INFORMATION

(71) Applicant: AT&T Intellectual Property I, L.P., Atlanta, GA (US)

(72) Inventor: Mostafa Tofighbakhsh, Cupertino, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 168 days.

This patent is subject to a terminal disclaimer.

(21) Appl. No.: 14/699,187

(22) Filed: Apr. 29, 2015

(65) Prior Publication Data

US 2015/0249601 A1   Sep. 3, 2015

Related U.S. Application Data

(63) Continuation of application No. 12/565,219, filed on Sep. 23, 2009, now Pat. No. 9,049,617.

(51) Int. Cl.
*H04L 12/721* (2013.01)
*H04L 12/24* (2006.01)
(Continued)

(52) U.S. Cl.
CPC .......... *H04L 45/70* (2013.01); *H04L 41/5067* (2013.01); *H04L 43/0835* (2013.01);
(Continued)

(58) Field of Classification Search
CPC ............. H04L 41/5067; H04L 43/0835; H04L 43/0858; H04L 43/087; H04L 43/0894;
(Continued)

(56) References Cited

U.S. PATENT DOCUMENTS 4,999,833 A   3/1991 Lee
5,042,027 A   8/1991 Takase et al.
(Continued)

OTHER PUBLICATIONS

Office Action dated Aug. 27, 2012 for U.S. Appl. No. 12/565,219, 32 pages.
(Continued)

*Primary Examiner* — Dung B Huynh
(74) *Attorney, Agent, or Firm* — Amin, Turocy & Watson, LLP

(57) ABSTRACT

Signaling-less call setup and teardown by employing observed Quality of Experience (QoE) and resource demands. A system provides an environment for supersonic treatment of observed QoE and Quality of Service (QoS) demands for mobile applications. Specifically, a monitoring component is employed to determine session state information associated with a traffic flow, which includes observed QoE and resource demand data. The session state information is stored in a shared memory location and can be analyzed to modify and/or create a network policy for the traffic flow. The network policy is applied to one or more traffic flows to minimize signaling exchanges between a communication network and a mobile station.

20 Claims, 10 Drawing Sheets

(51) Int. Cl.
  *H04L 12/26* (2006.01)
  *H04L 12/725* (2013.01)
  *H04W 24/08* (2009.01)
  *H04W 40/02* (2009.01)
  *H04W 40/24* (2009.01)
  *H04W 28/02* (2009.01)

(52) U.S. Cl.
  CPC ........ *H04L 43/0858* (2013.01); *H04L 45/302* (2013.01); *H04W 24/08* (2013.01); *H04W 40/02* (2013.01); *H04W 40/246* (2013.01); *H04L 43/087* (2013.01); *H04L 43/0894* (2013.01); *H04W 28/02* (2013.01)

(58) Field of Classification Search
  CPC ...... H04L 45/302; H04L 45/70; H04W 24/08; H04W 28/02; H04W 40/02; H04W 40/246
  See application file for complete search history.

(56) References Cited

U.S. PATENT DOCUMENTS

| | | | | |
|---|---|---|---|---|
| 5,164,938 | A * | 11/1992 | Jurkevich | H04J 3/1682 370/231 |
| 6,097,703 | A | 8/2000 | Larsen et al. | |
| 6,341,309 | B1 | 1/2002 | Vaid et al. | |
| 6,426,955 | B1 | 7/2002 | Gossett | |
| 6,560,243 | B1 | 5/2003 | Mogul | |
| 6,587,433 | B1 | 7/2003 | Borella et al. | |
| 6,643,496 | B1 * | 11/2003 | Shimoyama | H04L 43/0894 370/232 |
| 6,671,732 | B1 | 12/2003 | Weiner | |
| 6,683,853 | B1 | 1/2004 | Kannas et al. | |
| 6,760,567 | B1 | 7/2004 | Jeong et al. | |
| 6,826,150 | B1 | 11/2004 | Bhattacharya et al. | |
| 6,834,193 | B1 | 12/2004 | Linderborg et al. | |
| 6,856,601 | B1 | 2/2005 | Bell et al. | |
| 6,862,446 | B2 | 3/2005 | O'Neill et al. | |
| 7,000,016 | B1 | 2/2006 | Vanderbeck et al. | |
| 7,035,874 | B1 | 4/2006 | Reed et al. | |
| 7,167,860 | B1 | 1/2007 | Black et al. | |
| 7,496,661 | B1 | 2/2009 | Morford et al. | |
| 7,882,235 | B2 | 2/2011 | Yumoto et al. | |
| 8,099,500 | B2 | 1/2012 | Deason | |
| 8,194,540 | B2 * | 6/2012 | Kim | H04W 28/24 370/230 |
| 9,014,352 | B1 * | 4/2015 | Davis | H04Q 3/0091 379/112.01 |
| 9,049,617 | B2 * | 6/2015 | Tofighbakhsh | H04L 41/5067 |
| 2001/0012270 | A1 * | 8/2001 | Godoroja | G06F 21/606 370/230 |
| 2001/0019829 | A1 | 9/2001 | Nelson et al. | |
| 2001/0021186 | A1 | 9/2001 | Ono et al. | |
| 2002/0044557 | A1 | 4/2002 | Isoyama | |
| 2002/0062376 | A1 | 5/2002 | Isoyama | |
| 2002/0065837 | A1 | 5/2002 | Roach et al. | |
| 2002/0080719 | A1 | 6/2002 | Parkvall et al. | |
| 2002/0087696 | A1 | 7/2002 | Byrnes | |
| 2002/0109706 | A1 * | 8/2002 | Lincke | G06F 17/3089 715/700 |
| 2002/0119794 | A1 | 8/2002 | Byers et al. | |
| 2002/0120459 | A1 | 8/2002 | Dick et al. | |
| 2002/0155823 | A1 | 10/2002 | Preston et al. | |
| 2002/0156915 | A1 * | 10/2002 | Haggar | H04L 29/12009 709/238 |
| 2003/0028647 | A1 | 2/2003 | Grosu | |
| 2003/0028759 | A1 | 2/2003 | Prabhu et al. | |
| 2003/0031201 | A1 | 2/2003 | Choi | |
| 2003/0087649 | A1 | 5/2003 | Bhatia et al. | |
| 2003/0179720 | A1 * | 9/2003 | Cuny | H04L 47/14 370/310 |
| 2003/0202518 | A1 * | 10/2003 | Canali | H04L 41/00 370/395.21 |
| 2003/0212803 | A1 | 11/2003 | Wu et al. | |
| 2003/0221008 | A1 | 11/2003 | England et al. | |
| 2004/0008628 | A1 | 1/2004 | Banerjee | |
| 2004/0009792 | A1 | 1/2004 | Weigand | |
| 2004/0098511 | A1 * | 5/2004 | Lin | H04L 69/329 709/249 |
| 2004/0160914 | A1 * | 8/2004 | Sarkar | H04W 72/1226 370/329 |
| 2004/0184414 | A1 * | 9/2004 | Ohki | H04L 47/11 370/260 |
| 2004/0190452 | A1 * | 9/2004 | Imiya | H04L 12/2602 370/232 |
| 2004/0202113 | A1 * | 10/2004 | Moon | H04L 1/0002 370/252 |
| 2004/0215820 | A1 * | 10/2004 | Blair | H04L 12/2876 709/238 |
| 2004/0225661 | A1 | 11/2004 | Takayanagi | |
| 2004/0252701 | A1 * | 12/2004 | Anandakumar | H04B 7/06 370/395.21 |
| 2004/0266447 | A1 | 12/2004 | Terry | |
| 2005/0025163 | A1 * | 2/2005 | Christie | H04L 45/24 370/401 |
| 2005/0054364 | A1 | 3/2005 | Jokinen et al. | |
| 2005/0117586 | A1 | 6/2005 | Ikeda et al. | |
| 2005/0129026 | A1 | 6/2005 | Chang et al. | |
| 2005/0135247 | A1 * | 6/2005 | Scott | H04L 12/12 370/234 |
| 2005/0163095 | A1 | 7/2005 | Raleigh et al. | |
| 2005/0188015 | A1 | 8/2005 | Attwell | |
| 2005/0190746 | A1 | 9/2005 | Xiong et al. | |
| 2005/0198224 | A1 * | 9/2005 | Kobayashi | H04L 67/322 709/220 |
| 2005/0249113 | A1 | 11/2005 | Kobayashi et al. | |
| 2005/0249157 | A1 * | 11/2005 | Qian | H04L 43/0829 370/329 |
| 2005/0250509 | A1 | 11/2005 | Choksi | |
| 2005/0255833 | A1 * | 11/2005 | Bar-Or | H04W 4/12 455/412.1 |
| 2005/0282565 | A1 | 12/2005 | Shaheen | |
| 2006/0045045 | A1 * | 3/2006 | Blessent | H04B 17/382 370/328 |
| 2006/0050649 | A1 * | 3/2006 | Botton-Dascal | H04L 12/2697 370/252 |
| 2006/0059261 | A1 | 3/2006 | Finkenzeller et al. | |
| 2006/0072526 | A1 | 4/2006 | Rasanen | |
| 2006/0153174 | A1 | 7/2006 | Towns-von Stauber et al. | |
| 2006/0168336 | A1 | 7/2006 | Koyanagi et al. | |
| 2006/0268756 | A1 * | 11/2006 | Wang | H04W 36/32 370/310 |
| 2006/0280160 | A1 * | 12/2006 | Padovani | H04B 7/264 370/347 |
| 2007/0033632 | A1 * | 2/2007 | Baynger | G11B 27/034 725/135 |
| 2007/0076664 | A1 * | 4/2007 | An | H04W 80/10 370/331 |
| 2007/0110003 | A1 * | 5/2007 | Tujkovic | H04B 7/0452 370/335 |
| 2007/0130167 | A1 | 6/2007 | Day et al. | |
| 2007/0133556 | A1 | 6/2007 | Ding et al. | |
| 2007/0143498 | A1 | 6/2007 | Uhlemann | |
| 2007/0153747 | A1 | 7/2007 | Pan et al. | |
| 2007/0156804 | A1 | 7/2007 | Mo | |
| 2007/0165524 | A1 * | 7/2007 | Mascolo | H04L 69/163 370/230 |
| 2007/0195818 | A1 | 8/2007 | Stephenson et al. | |
| 2007/0274490 | A1 | 11/2007 | Hu et al. | |
| 2008/0161004 | A1 | 7/2008 | Burgess et al. | |
| 2008/0313300 | A1 | 12/2008 | Alanara et al. | |
| 2009/0059937 | A1 * | 3/2009 | Kanada | H04L 41/5003 370/401 |
| 2009/0096621 | A1 | 4/2009 | Ferlitsch | |
| 2009/0109857 | A1 | 4/2009 | Statia et al. | |
| 2009/0164657 | A1 * | 6/2009 | Li | H04L 41/0896 709/233 |
| 2009/0172783 | A1 | 7/2009 | Eberstadt | |
| 2009/0274045 | A1 | 11/2009 | Meier et al. | |
| 2010/0034367 | A1 | 2/2010 | Das et al. | |

(56) References Cited

U.S. PATENT DOCUMENTS

| | | |
|---|---|---|
| 2010/0191829 A1 | 7/2010 | Cagenius |
| 2011/0003609 A1 | 1/2011 | Sundstroem et al. |
| 2011/0022705 A1 | 1/2011 | Yellamraju et al. |
| 2011/0208853 A1 | 8/2011 | Castro-Castro et al. |
| 2011/0216648 A1* | 9/2011 | Mehrotra ................ H04L 47/25 370/230 |
| 2012/0011413 A1* | 1/2012 | Liu ....................... H04L 1/0009 714/746 |
| 2012/0059944 A1 | 3/2012 | Fernandez Alonso et al. |

OTHER PUBLICATIONS

Office Action dated Mar. 14, 2013 for U.S. Appl. No. 12/565,219, 37 pages.

Notice of Allowance dated Jan. 30, 2015 for U.S. Appl. No. 12/565,219, 49 pgs.

\* cited by examiner

SIGNALING-LESS DYNAMIC CALL SETUP AND TEARDOWN BY UTILIZING OBSERVED SESSION STATE INFORMATION

CROSS-REFERENCE TO RELATED APPLICATION

This application is a continuation of, and claims priority to, U.S. patent application Ser. No. 12/565,219, filed Sep. 23, 2009, and entitled "SIGNALING-LESS DYNAMIC CALL SETUP AND TEARDOWN BY UTILIZING OBSERVED SESSION STATE INFORMATION," the contents of which application are hereby incorporated herein by reference in their entirety.

TECHNICAL FIELD

The subject disclosure relates to wireless communications and, more particularly, to facilitating dynamic call setup and/or teardown based on an observed Quality of Experience (QoE) and/or resource demand.

BACKGROUND

Advances in wireless telecommunications are rapidly increasing the utilization of mobile devices that handle communication of media and data between users and providers. Typically, mobile devices have connected to mobile networks, such as a wireless wide area network (WWAN) employing a wireless connection (e.g. 2G/3G/3.5G/4G). Traditionally, voice services over wireless networks were provided by circuit-switched (CS) systems wherein a dedicated channel was used for each voice call. Although CS systems provide a guaranteed Quality of Service (QoS) in terms of end-to-end (ETE) delay for the voice traffic, the network is inefficiently utilized. This is because resources for the dedicated channel are always reserved, even when communication is not carried out over the channel.

In particular, traditional CS networks enable opening a circuit between participants at the beginning of a call and allocating the total bandwidth on that circuit to the participants for the duration of the call. If the participants need less bandwidth, the operator cannot share the allocated bandwidth with other users, or if they need more bandwidth, the operator is unable to provide additional bandwidth. As wireless communications evolve, packet-switched (PS) networks have been developed that provide operators extra flexibility to optimize coverage, call quality and data speed. PS networks typically stream one or more packets (voice and/or data) to/from the user, by a route, which is determined based on an algorithm. Thus, the network operator can prioritize different types of packets according to user demand. However, the PS network imposes a 'best-effort' constraint on packet delivery. For example, the PS network employs best efforts to deliver packets to their destination on time, but the PS network cannot guarantee their arrival schedule.

In addition, the wireless environment and the mobility of users present additional challenges to packet delivery. For example, radio channel conditions between a device and the network can usually vary and the channel can become better or worse over time. Thus, a constant Quality of Service (QoS) is difficult to maintain over time. The traditional signaling approach provides a significant overhead with signaling exchanges among the networks and devices. Accordingly, call setup and treatment is delayed and is not optimum. Further, for advanced data services in mobile communications, such as, but not limited to, email, streaming and/or video communication, the conventional systems do not provide significant QoS support, leading to inefficient utilization of network resources.

DETAILED DESCRIPTION

Figure 1:
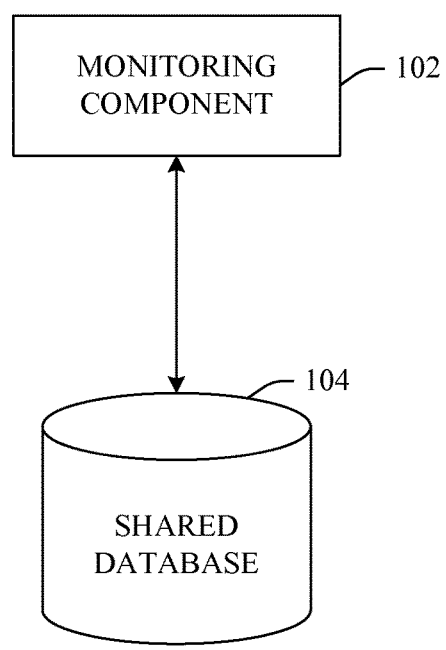
FIG. 1 illustrates an example system that facilitates storage of observed session state information associated with a traffic flow in a wireless communication network.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings. One or more embodiments are described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "end device," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Traditional wireless communication systems employ a significant amount of signaling during call setup and tear-down. The overhead associated with the signaling leads to delayed (and/or not optimum) application flows. The systems and methods disclosed herein provide an ability to treat application flows in optimum manner instead of utilizing massive signaling overhead. In one example, end devices, for example, user equipment (UE), can update their session state information at a source in a distributed shared memory virtual address. The session state information can include observed Quality of Experience (QoE) data, which can be collectively utilized by a scheduler in the network to update and/or modify a flow, a service provider policy, etc. Accordingly, signaling overhead can be reduced and updates and/or adjustments to a QoE and/or Quality of Service (QoS) matrices can be performed with simple updates to the matrices.

The systems and methods disclosed herein, in one aspect thereof, can facilitate dynamic adjustment of one or more traffic flows based in part on observed Quality of Experience (QoE) information and/or resource demand in a packet switched communication network. Typically, the system can observe conditions associated with a traffic flow and determine session state information for the flow. As an example, the session state information can include, but is not limited to, a session name associated with the flow, a mode of operation, a Quality of Experience (QoE) factor, observed QoE value, resource requirements, observed network states, etc. Further, the system can store the determined session state information in a shared database. The shared database can reside at source (e.g. UE, application), within network, within an external entity, and/or can be distributed. According to an embodiment, the stored information can be accessed by most any monitoring tool, which can update the stored information. According to another embodiment, the stored information can be pulled by most any scheduling tool and/or application, which can utilize the stored session state information to make policy decisions.

In accordance with another aspect, a scheduling component can be employed that can facilitate policy decisions based on an analysis of the information stored in the shared database. The policy decisions can include updating an existing policy and/or creating a new policy. In one aspect, the scheduling component can dynamically apply the updated or new policy to a flow or a group of flows based on the analysis. Moreover, updating the policy can include, but is not limited to, updating a Quality of Service (QoS) class for the flow or the group of flows, updating a mode of operation (e.g., setting an idle mode), applying back pressure on a set of flows when congestion is observed, updating amount of resources allocated to the flow, etc.

Yet another aspect of the disclosed subject matter relates to a method that can be employed to facilitate dynamic adjustment of a network policy and efficient end-to-end (ETE) resource utilization based on observed QoE data.

Typically, session state data associated with a traffic flow (e.g., audio, video, data, multimedia, etc.) can be monitored and stored in a shared database. The session state data can include, but is not limited to, observed QOE, network state dynamics, resource demands, and/or user/application/service provider preferences. In one aspect, the session state data can be pulled from the shared database for example, periodically, dynamically, based on network provider and/or user preferences, based on a network policy, etc. Moreover, the pulled session state data can be analyzed and a network policy can be updated based on the analysis. Further, the updated network policy can be applied to a set of traffic flows to minimize signaling between the communication network and mobile stations.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates storage of observed session state information associated with a traffic flow in a wireless communication network, in accordance with an aspect of the subject system. Typically, system 100 can include a monitoring component 102 that can be utilized to observe conditions associated with a traffic flow. It can be appreciated that the traffic can include, but is not limited to, voice, video, and/or data traffic. In one aspect, the monitoring component 102 can determine session state information associated with the traffic flow. As an example, the session state information can include, but is not limited to, a session name, a mode of operation, data indicating whether a Quality of Experience (QoE) factor is enabled or disabled, observed QoE, resource requirements, observed network states, etc.

According to an aspect, the observed QoE can be determined by monitoring the traffic flow and analyzing various factors, such as, the number of good packets received by a user equipment (UE), a rate of receiving good packets, delay, jitter, bandwidth, frame rate, packet loss, and/or most any information associated with an application on the UE. However, observed QoE determination is not limited to the aforementioned factors and observed QoE can be determined based on location of UE, GPS data, user satisfaction, content of data delivered, etc. In one example, application specific QoE contract can be location specific, such as, but not limited to, inside a building versus outside the building, in dense metro areas, etc.

In one embodiment, the monitoring component 102 can reside within a UE. In this case, the monitoring component 102 can observe QoE at the UE. For example, the monitoring component 102 can determine that the UE is not receiving packets at a specific rate that is suitable for communication and/or providing user satisfaction, and/or can determine that "X" number of packets were dropped, an/or can determine user satisfaction based on explicit user input and/or user satisfaction can be inferred, etc. In an additional or alternate embodiment, the monitoring component 102 can reside within the communication network, for example the core network. In this case, the monitoring component 102 can apply one or more policies, for example, set by a service provider, to determine a QoE observed by a UE. Further, an application (e.g. at the source) can also facilitate determination of observed QoE, session state information, resource utilization information, and/or the like. In one aspect, the monitoring component 102 can determine observed QoE based on determination of various parameters, such as, but not limited to, bandwidth, delay, jitter, packet loss, frame rate, content of data, location specifics, etc. For example, an application specific QoE contract can be location specific, such as, based on location of UE (e.g., inside or outside a building, in a dense metro area, etc.). In one example, the set of parameters for QoE determination can be specified by the UE, application and/or network.

Furthermore, the system 100 can include a shared database 104 that can be updated by the monitoring component 102. The shared database 104 can reside at source (e.g., UE), within network, within an external entity, and/or can be distributed. In particular, the shared database 104 can include mutual and/or shared memory locations, which can be updated by an application, a network, and/or a UE, with session state information and can reside completely or partially in a source, an application, the network or a UE. In one aspect, the shared database 104 can be accessed by most any monitoring tool, such as monitoring component 102, which can write to the memory. Additionally, most any tool and/or application can utilize shared locks to concurrently and/or simultaneously read the stored data and utilize the stored session state data to make a policy decision.

In one aspect, when the shared database 104 is within a UE, information from the shared database 104 can be pulled by the communication network in an aggregated form, periodically, dynamically, in real-time, etc. In another aspect, when the shared database 104 is within the communication network, the session state information can be stored in the shared database 104 by a sample caching mechanism that can run in the background. Specifically, the shared database 104 can maintain session state information, which can include observed QoE and resource specifications for each flow within the communication network. The monitoring component 102 can update the stored information for each flow based on the observations. Observed QoE and network state dynamics can also be stored in the shared database 104.

In an aspect, the monitoring component 102 can change, update and/or modify the session states stored in the shared database 104 within specified boundaries, for example, bandwidth can trotter between 0-1 Meg, delay can be bounded between 100 ms and 200 ms, jitter can be set to specific range, observed QoE can be updated, network resource requirements can be specified, enforced polices can be set, UE location can be set (e.g., indoor, outdoor, home, work, vehicular, etc.). According to an embodiment, the information stored in shared database 104, including observed QoE and/or resource requirements can be utilized by a scheduler or application with a core network, to adjust the Quality of Service (QoS) support associated with the flow based in part the observed QoE. Further, the scheduler can also update routes, schedules and/or network policies based on the observed QoE and/or resource requirements.

It can be appreciated that the shared database 104 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 2:
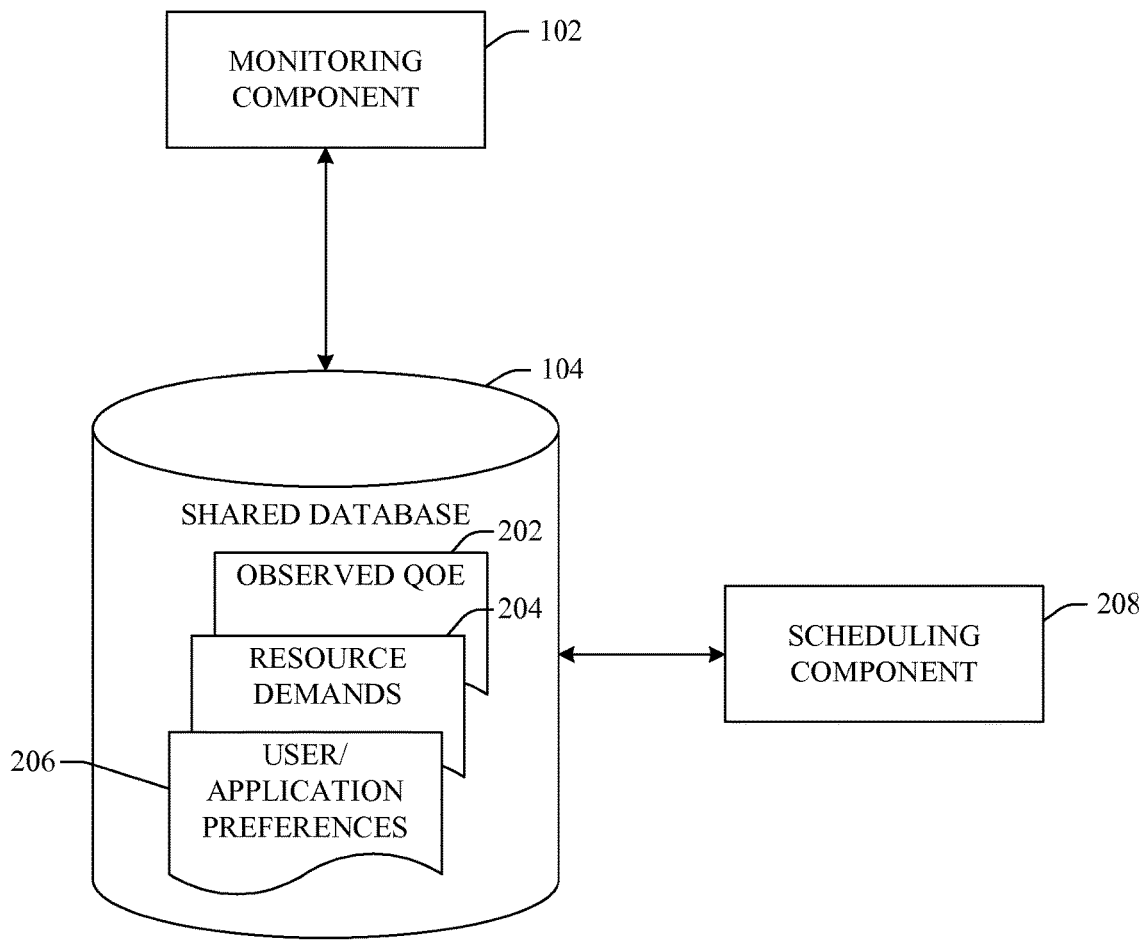
FIG. 2 illustrates an example system that can be employed for signaling-less dynamic call setup and teardown.

Referring to FIG. 2, there illustrated is an example system 200 that can be employed for signaling-less dynamic call setup and teardown in accordance with an aspect of the subject disclosure. It can be appreciated that the monitoring component 102 and shared database 104 can include respective functionality, as more fully described herein, for example, with regard to system 100.

According to an aspect, the monitoring component 102 and/or shared database 104 can reside within a UE and/or a communication network. Typically, the UE as disclosed herein can include most any communication device employed by a subscriber, such as, but not limited to, a cellular phone, a personal digital assistant (PDA), a laptop, a personal computer, a media player, a gaming console, and the like. Moreover, the UE can access the communication network via most any radio technology. It can be appreciated that the communication network can include most any radio environment, such as, but not limited to, Universal Mobile Telecommunications System (UMTS), Global System for Mobile communications (GSM), LTE, WiFi, WiMAX, CDMA, etc.

As described previously, the monitoring component 102 can observe and determine session state information associated with a traffic flow between the communication network and the UE. Specifically, the monitoring component 102 can determine an observed QoE for a traffic flow, based on various factors, such as but not limited to, packet delivery rate, dropped packet rate, frame rate, UE preferences, network preferences, application preferences, user input, delay, jitter, bandwidth, location specifics, etc. Further, the monitoring component 102 can store the determined information within shared database 104. In one aspect, the information stored in the shared database 104 can include, observed QoE 202, resource demands 204, and/or, user and/or application preferences 206. For example, the monitoring component 102 can calculate an observed QoE that is experienced by an end user and can also determine whether additional network resources can help improve QoE, for example beyond a specified threshold. The observed QoE 202 and resource demands 204 data can be stored by the monitoring component 102 in the shared database 104. Further, user and/or application (or device) preferences (e.g., a user can set a preference in an application on the UE to receive a notification or alert each time an email is received) can be stored within 104.

System 200 further includes a scheduling component 208 that facilitates policy decisions based on an analysis of the information stored in shared database 104 that can adjust the traffic flow. In one aspect, the scheduling component 208 can apply one or more policies for a flow or a group of flows depending on analysis. As an example, the scheduling component 208 can update the QoS class, update the mode of operation (e.g., set an idle mode), apply backpressure on as set of flows when congestion is observed (e.g., by the monitoring component 102), etc., for the flow or group of flows. Typically, the observed QoE associated with a flow can continuously vary because of the wireless & mobile nature of communications. For example, when a UE is in motion, the signal strength can change and observed QoE can change. System 200 can facilitate observing the QoE (e.g., by the monitoring component 102) and accordingly adapting one or more flows (e.g., by the scheduling component 208).

Figure 3:
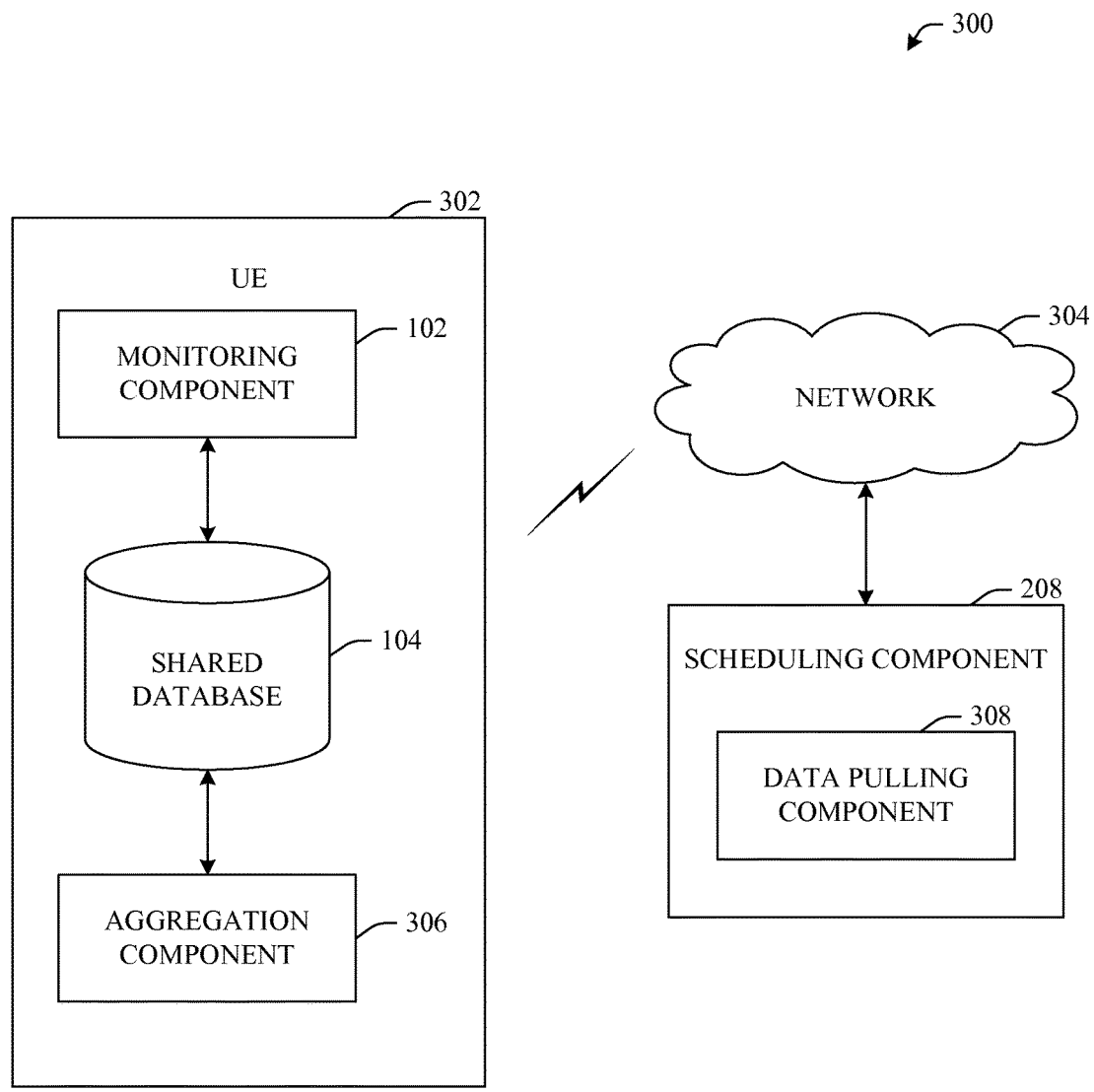
FIG. 3 illustrates an example system that can be employed to facilitate dynamic adjustment of one or more traffic flows based in part on observed Quality of Experience (QoE) information.

Referring now to FIG. 3, there illustrated is an example system 300 that can be employed to facilitate dynamic adjustment of one or more traffic flows based in part on observed QoE information, according to an aspect of the subject disclosure. It can be appreciated that the monitoring component 102, shared database 104 and scheduling component 208 can include respective functionality, as more fully described herein, for example, with regard to systems 100 and 200. In one aspect, the monitoring component 102 and shared database 104 can be located within a UE 302. However, the subject application is not so limited and as noted previously, the monitoring component 102 and the shared database 104 can reside completely, partially, or be distributed between, UE 302, network 304, an application or a third party entity (not shown).

Additionally, UE 302 can be, but is not required to be, for instance, a communication device, a multi-mode device, a dual-mode device, a dual-mode cellular/IP device, a mobile communication device, a cellular device that connects to a fixed IP network, a smartphone, a gaming device, a home media center, a portable media player, a satellite phone, a desktop device, a cellular phone, a portable gaming device, a mobile phone, a portable music player, a portable device, a laptop, a personal digital assistant, or a handheld or combinations thereof that can employ most any wireless mobile communication technology to communicate with network 304.

System 300 can typically include an aggregation component 306 that can be utilized to aggregate information stored within the shared database 104. It can be appreciated that although the aggregation component 306 is illustrated to reside within the UE 302, the aggregation component 306 can reside at most any location, such as, but not limited to, within the network 304, the scheduling component 208, and/or at a third party entity (not shown). In one aspect, the aggregation component 306 can analyze the information in the shared database 104 and select data that can be delivered to the scheduling component 208, in a manner such that signaling is reduced. As an example, the aggregation component 306 can identify essential information associated with a traffic flow, which can be utilized by the scheduling component 208 to make policy decisions. Further, the aggregation component 306 can also aggregate information associated with multiple flows and/or can sample the data associated with multiple flows from the shared database 104. Typically, the multiple flows can belong to a specific category, as explained in detail infra.

The scheduling component 208 can utilize the aggregated information to create or update a policy associated with the traffic flow and/or with the multiple traffic flows. According to an aspect, a data pulling component 308 can be utilized to pull data from the aggregation component 306. In one example, the pulling component 308 can pull data depending on a service provider preference, such as, but not limited to, periodically or in real time. Typically, a network operator can determine a time period for pulling data or the time period can be automatically determined, for example, when the network is idle or when available bandwidth is greater than a threshold. In one aspect, the scheduling component 208 can update one or more policies, such as, a policy that determines allocation of resources, flow routes, QoS support, etc. based on an analysis of the received data. Moreover, an Internet Protocol (IP) architecture can be enhanced with real time source and/or network initiated session state updates. In particular, a simple trigger protocol can be employed (e.g., by the data pulling component 308) to synch up the state changes from the shared database 104 with the network and vice versa. In one aspect, the data pulling component 308 can sample data from different UEs for aggregation treatment and the scheduling component 208 can modify one or more policies associated with disparate UEs based on the aggregation data. Additionally, the data pulling component 308 can pull the session state updates every interval and avoid massive signal processing performed in conventional systems. Accordingly, a faster steady state can be achieved by pulling session state information from the end devices and signaling exchanges among the networks and devices can be minimized In addition, dynamic and QoS/QoE adaptation can be achieved in a distributed fashion and signaling overhead can be reduced, for example, by 10-100 folds.

Figure 4:
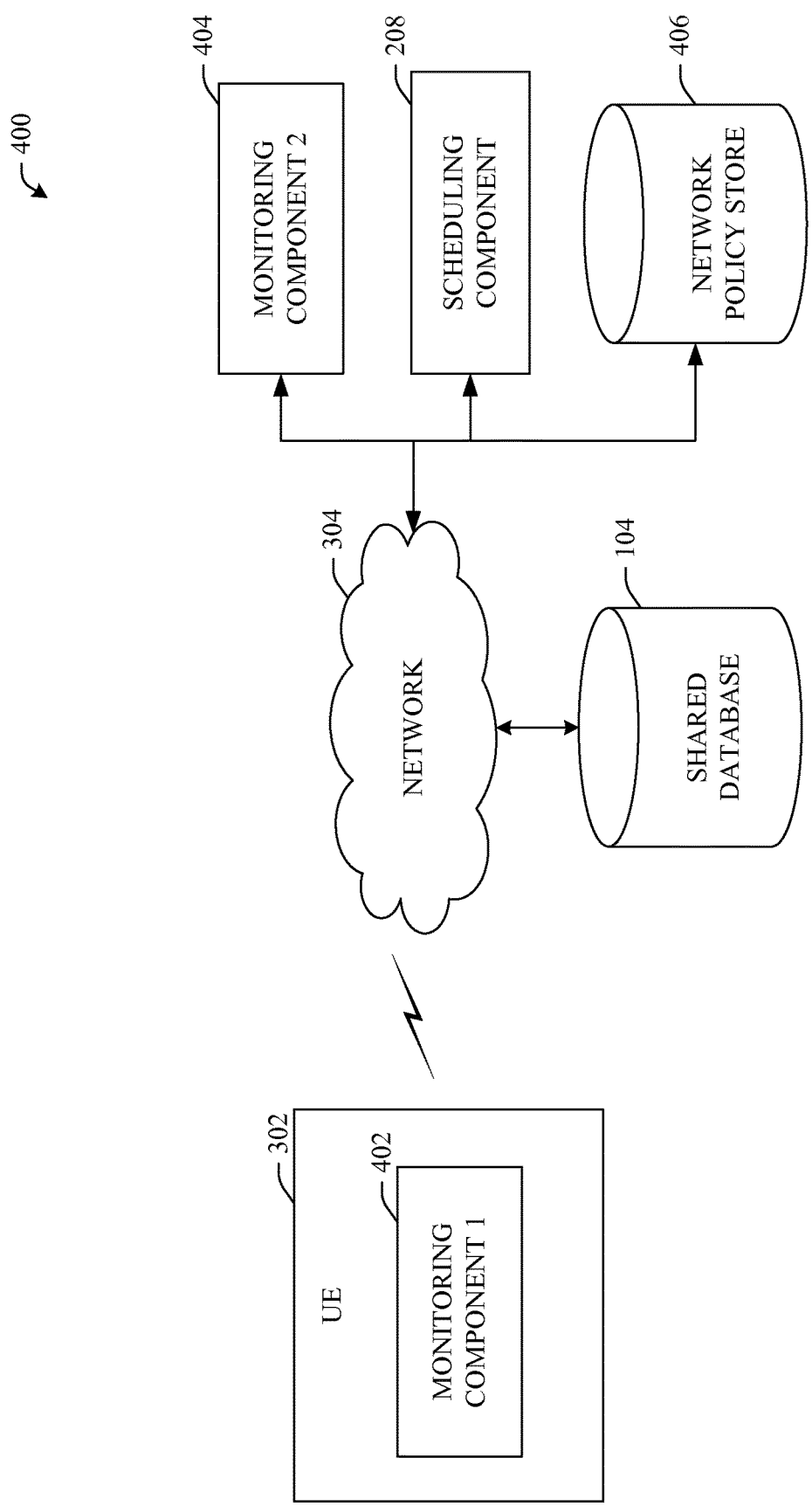
FIG. 4 illustrates an example system that provides a shared memory space, which can store session state information associated with a traffic flow that can be utilized to dynamically adjust one or more network policies.

FIG. 4 illustrates an example system 400 that provides a shared memory space, which can store session state information associated with a traffic flow that can be utilized to dynamically adjust one or more network policies in accordance with the subject innovation. It can be appreciated that the shared database 104, scheduling component 208, UE 302, and network 304 can include respective functionality, as more fully described herein, for example, with regard to systems 100, 200 and 300. Further, monitoring component1 (402) and monitoring component2 (404) can be substantially similar to monitoring component 102 as more fully disclosed herein, for example, with regard to systems 100, 200 and 300, and can include functionality thereof.

The shared database 104 included in system 400 can be updated by monitoring component1 402 and/or monitoring component2 404. It can be appreciated that although the shared database 104 is depicted to reside on the network 304, the shared database can be located on the UE 302, at a third party entity, on a disparate network, and/or can be distributed. Moreover, monitoring component 1 402 can determine session state information associated with a traffic flow based on various factors, such as, but not limited to, the communication received at the UE 302, the location of the UE 302, motion of the UE 302, user input, etc. Further, the UE 302 can allocate a session state memory area when a call is initiated or terminated, and can update the session state dynamics including the observed application QoE. According to one aspect, the determined information can be aggregated (e.g., by an aggregation component 306) and can be pulled by the network and stored within the shared database 104, for example, periodically, dynamically, or based on a specified policy.

Additionally or alternately, the monitoring component2 404 can also determine session state information associated with the traffic flow (and/or disparate traffic flows) and update the shared database 104. As an example, monitoring component2 404 can be located most anywhere in the network 304 and can determine session state information associated with a traffic flow based on most any proxy monitoring mechanism. For example, session state information associated with a flow can be determined based on a policy defined by a network operator, content delivery time, amount of data exchanged, etc. In one aspect, the monitoring component2 404 can classify traffic flows within network 304 into multiple categories and can sample data associated with a subset of flows in each category. Moreover, the sampled data can be stored in the shared database 104. In one aspect, monitoring component2 404 can be useful for monitoring traffic flows and determining session state information for the traffic flows to UEs that do not include a monitoring component (not shown).

According to an embodiment, the scheduling component 208 can retrieve data associated with the traffic flow (and/or the subset of traffic flows) from the shared database 104 and can analyze the retrieved information. Based on the analysis, the scheduling component 208 can create a new network policy and/or update/delete an existing network policy associated with the traffic flow and/or a set of disparate traffic flows (e.g., that belong to the same category as the traffic flow). In one aspect, a network policy store 406 can be employed that stores network policies associated with traffic flows in network 304. The network policy store 406 can be updated by the scheduling component 208 based on an analysis of the data from shared database 104. As an example, the scheduling component 208 can update a policy that facilitates allocation of resources, flow routes, QoS support, etc. associated with the traffic flows. Typically, the network policy store 406 can include, and is not limited to, both volatile and nonvolatile memory, removable and non-removable memory.

Consider an example, wherein, the shared database 104 can store one or more user preferences. Typically, applications (e.g. on UE 302) can decide what type of features the application can employ and/or decide the signaling between the application and network 304. Oftentimes, these decisions can increase network traffic and lead to network performance issues. For example, a user can set a preference via UE 302 to receive a notification from an email server when the user gets an email. However, when the volume of emails is large, the network 304 can easily get overloaded. In this example scenario, the scheduling component 208 can determine and/or modify a policy within the network policy store 406 that can be enforced, such that the signaling is minimized and congestion and/or network overload can be avoided. As an example, the scheduling component 208 can create/modify a policy, which can ensure that signals from the email server can be aggregated, such that, a notification can be sent to the UE 302 when the network 304 is idle, or periodically, or after "X" number of signals are received, (where "X" can be most any natural number from 1 to infinity), etc.

In another example scenario, an application can get aggressive when information is not properly received at the UE 302 through the network 304. Moreover, aggressive applications can retransmit signals too often, resulting in network congestion. The scheduling component 208 can create/modify a policy, which can ensure that the application is notified of the current network status. Further, information stored in shared database 104, for example, observed QoE data, can be visible to both the application and the network 304. Accordingly, based on an analysis of the stored information, the scheduling component 208 can facilitate adjusting network policies to apply backpressure, adjust bandwidth allocation, and/or request the application to back off when the network is busy. According to an aspect, the shared database 104 provides the scheduling component 208 a view of UE behavior, which facilitates enhanced and optimized end-to-end (ETE) QoS and QoE treatment. The scheduling component 208 can enable the networks 304 and router nodes to drive their route updates from the UEs in their domains. In one aspect, the scheduling component 208 can interact independently based on its aggregation view of the session state information collected for ETE treatment.

Figure 5:
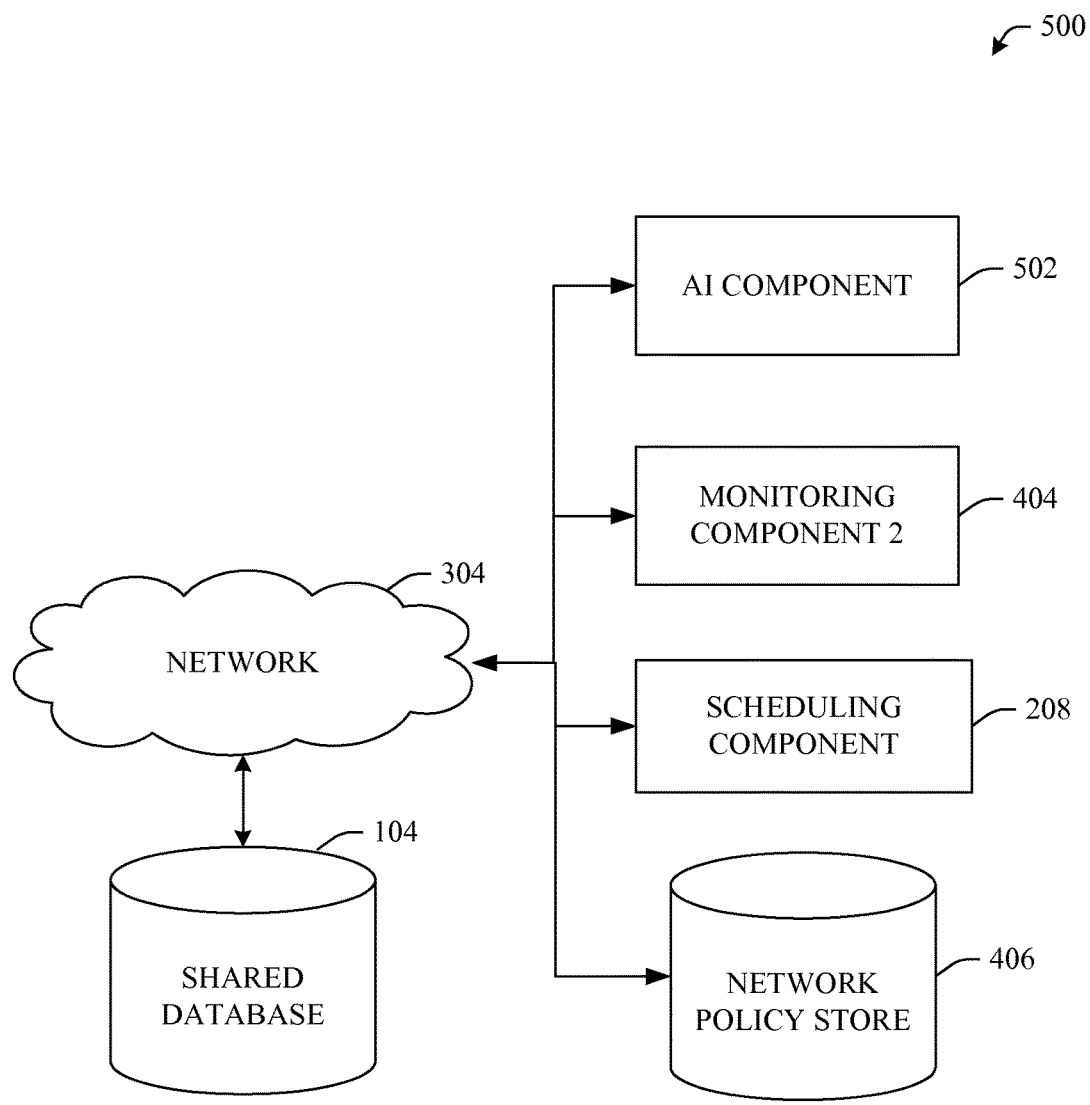
FIG. 5 illustrates an example system, which facilitates automating one or more features by employing an artificial intelligence mechanism in accordance with the subject innovation.

FIG. 5 illustrates a system 500 that employs an artificial intelligence (AI) component 502, which facilitates automating one or more features in accordance with the subject innovation. It can be appreciated that the shared database 104, scheduling component 208, monitoring component2 404, network policy store 406, and network 304 can include respective functionality, as more fully described herein, for example, with regard to systems 100, 200, 300 and 400. The subject innovation (e.g., in connection with monitoring and/or analysis) can employ various AI-based schemes for carrying out various aspects thereof. For example, a process for determining an update to a policy stored in the network policy store 406 can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of wireless communication systems, for example, attributes can be derived from information stored in the shared database 104 and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when the shared database can be updated, when and how a network policy can be updated/created/deleted, etc. The criteria can include, but is not limited to, observed QoE, resource demands, historical patterns, UE behavior, user preferences, service provider preferences and/or policies, location of the UE, motion of the UE, network status, etc.

Figure 6:
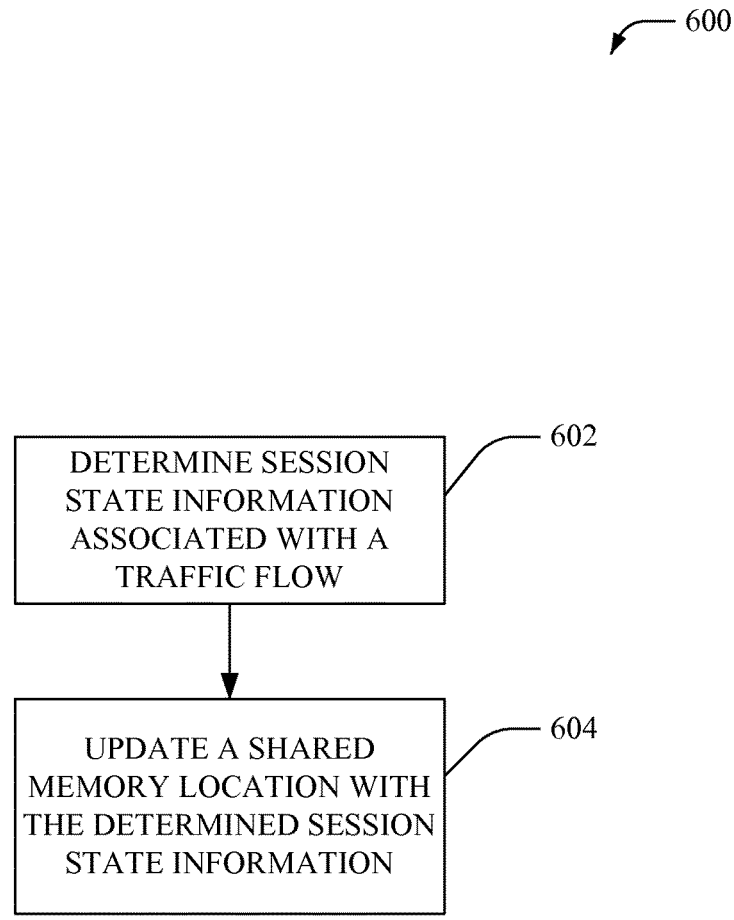
FIG. 6 illustrates an example methodology that can be utilized to facilitate minimizing the signaling exchanges among wireless communication networks and mobile devices, during communication setup and/or teardown.
Figure 7:
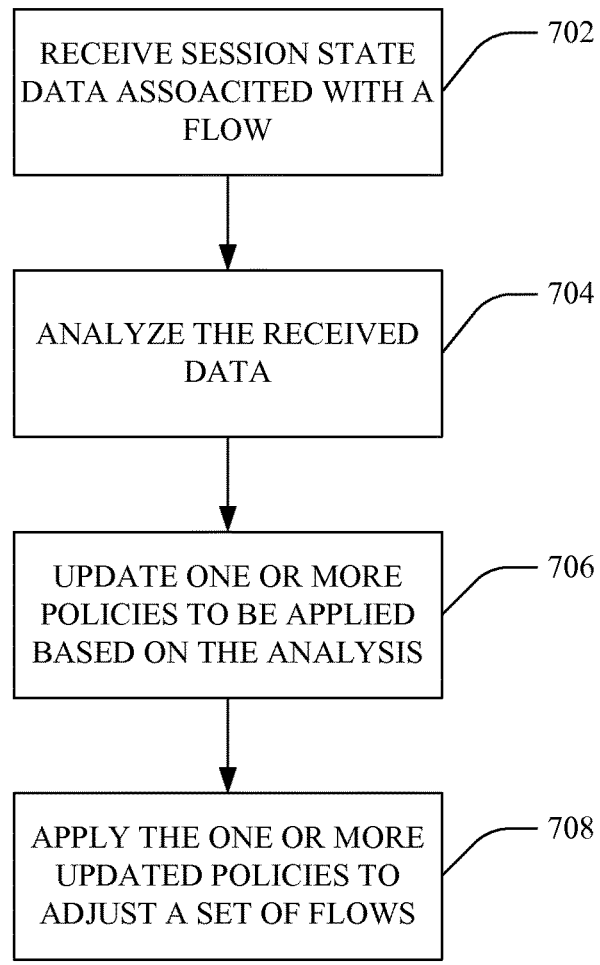
FIG. 7 illustrates an example methodology that facilitates dynamically adjusting one or more network policies and increasing end-to-end (ETE) resource utilization based on observed QoE data.
Figure 8:
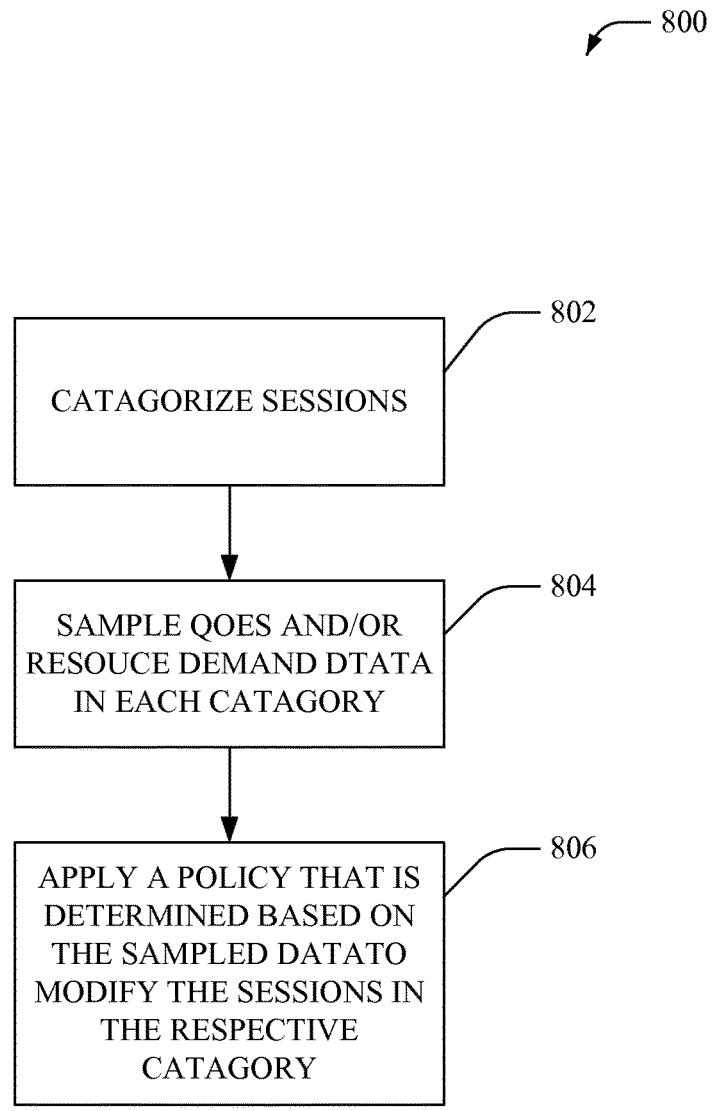
FIG. 8 illustrates an example methodology facilitates mitigating signal exchange and processing during dynamic call setup and/or teardown based on an observed QoE and/or resource demands.

FIGS. 6-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 6, illustrated is an example methodology 600 that can be utilized to facilitate minimizing signaling exchanges among networks and mobile devices, during communication setup and/or teardown. At 602, session state information associated with a traffic flow can be determined. As an example, the session state information can include, but is not limited to, a session name associated with the flow, a mode of operation, a QoE factor that indicates whether QoE is enabled or disabled, an observed QoE, resource demand, an observed network state, etc. Further, it can be appreciated that the session state information can be determined by monitoring and/or observing the traffic flow, location and/or motion of the mobile device, user preferences, network provider preferences, and the like. Specifically, the monitoring and/or observing can be performed on the network side, mobile device side and/or by a third party entity. Moreover, the session state information can be stored in the shared memory location by employing a sample caching mechanism that can run in the background.

At 604, a shared memory location can be updated with the determined session state information. The shared memory location can be read by one or more decision making tools that can update a policy, modify allocation of resources, and/or adjust a route based on an analysis of the stored information. According to one aspect, the session state information can be pulled, for example, by the network in an aggregated form, periodically, dynamically, in real-time, when network is idle, etc.

FIG. 7 illustrates an example methodology 700 that facilitates dynamically adjusting one or more network policies and increasing ETE resource utilization based on observed QoE data, in accordance with an aspect of the subject specification. At 702, session state data associated with a traffic flow (e.g., audio, video, data, multimedia, etc.) can be received. In one aspect, the session state data can be pulled from an end device, and/or a shared database for example, periodically, dynamically, based on network provider and/or user preferences, based on a network policy, etc. The session state data can include, but is not limited to, observed QoE, network state dynamics, resource demands, and/or user/application/service provider preferences. As an example, the observed QoE can be determined based on determining various parameters associated with the traffic flow, such as, but not limited to, packet delivery rate, dropped packet rate, frame rate, UE preferences, network preferences, application preferences, user input, delay, jitter, bandwidth, location specifics, etc. Typically, the application and/or network can agree on a QoE parameter set.

At 704, the received session state data can be analyzed. Further, at 706 one or more network policies can be updated based on the analysis. Furthermore, at 708, the one or more updated policies can be applied to a set of traffic flows to minimize signaling between the communication network and end device. For example, a QoS class for a flow or group of flows can be updated, a mode of operation (e.g., set an idle mode) can be set and/or changed, resource allocation can be changed, backpressure can be applied (when congestion is observed), etc.

FIG. 8 illustrates an example methodology 800 that facilitates mitigating signal exchange and processing during dynamic call setup and/or teardown based on an observed Quality of Experience (QoE) and/or resource demands, according to an aspect of the subject disclosure. At 802, communication sessions can be categorized. In one aspect, sessions with one or more common or similar properties can be grouped in the same category. At 804, QoE and/or resource demand data can be sampled in each category. Specifically, an observed QoE and/or resource demand associated with one or more sample sessions can be determined. More specifically, the sampled data can be analyzed and a network policy can be created and/or adjusted based on the analysis. At 806, the network policy can be applied to a set of sessions in the category. For example, data, including observed QoE and/or resource demand, associated with a particular session (e.g., session number 7), can be determined and a policy can be updated based on an analysis of the data. The updated policy can be applied to set of sessions (e.g., session numbers 7, 12, and 22) and/or all the sessions in the category.

Figure 9:
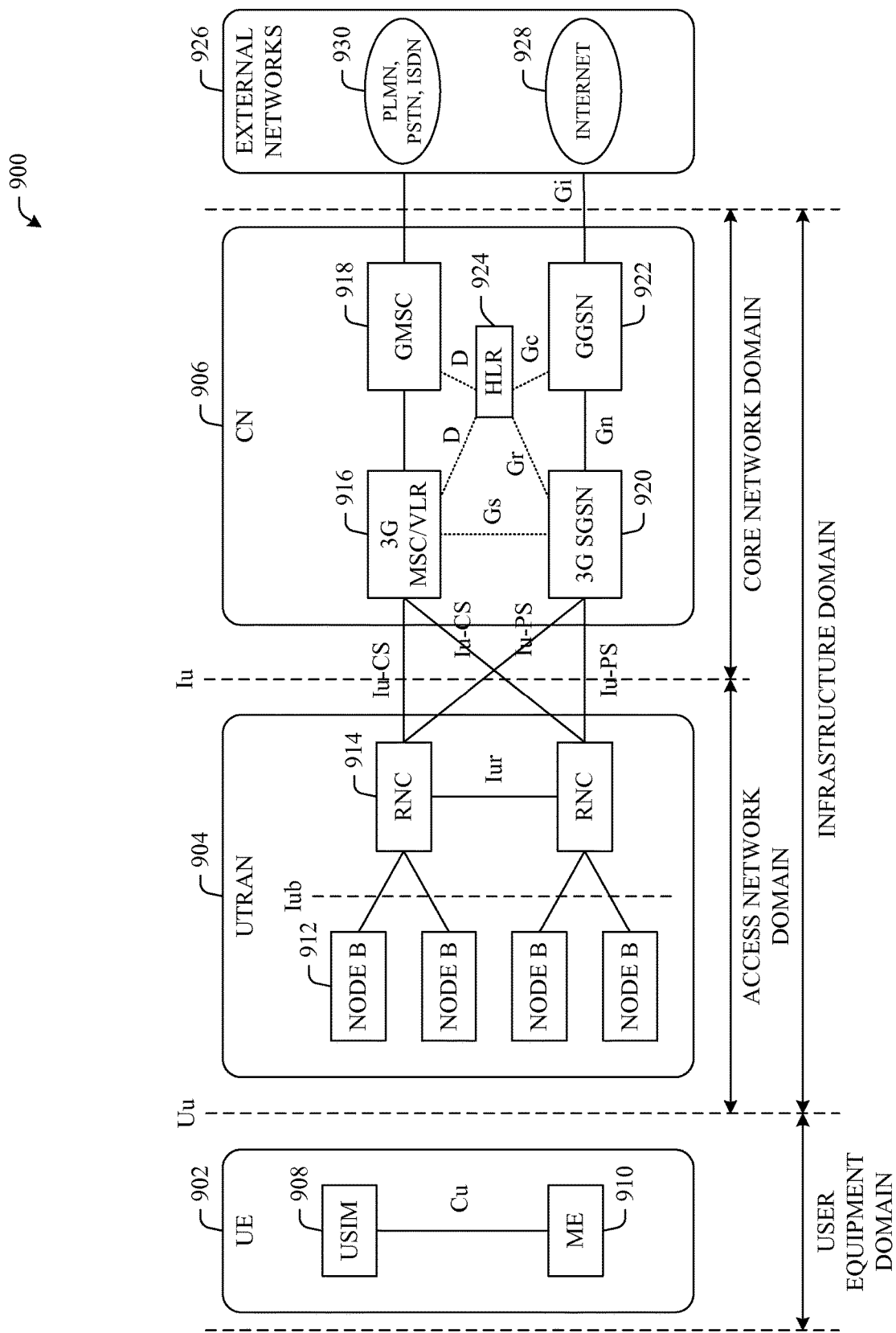
FIG. 9 illustrates an exemplary UMTS network that facilitates dynamic call setup and/or teardown based on session state information in accordance with the subject innovation.

FIG. 9 illustrates an exemplary UMTS network 900 that facilitates dynamic call setup and/or teardown based on session state information in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading). UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 900 can consist of three interacting domains; a user equipment (UE) domain 902, a UMTS Terrestrial Radio Access Network (UTRAN) domain 904, and a core network (CN) domain 906. The UTRAN domain 904 is also referred to as the access network domain and the CN 906 is referred to as the core network domain, the both of which comprise an infrastructure domain.

The UE domain 902 includes a USIM (user services identity module) domain and an ME (mobile equipment) domain. User equipment is the equipment used by the user to access UMTS services. In the UE domain 902, the UMTS IC card is the USIM 908, which has the same physical characteristics as GSM SIM (subscriber identity module) card. The USIM interfaces to ME 910 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 904 provides the air interface access method for the UE domain 902. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 912, and control equipment for Node-B devices is called a radio network controller (RNC) 914. The interface between the Node-B device and the RNC 914 is the IuB interface. The interface between two RNCs is called the Iur interface. According to an aspect, the adaptive R99 CS and CS over HSPA Link diversity that facilitates enhanced coverage and capacity, described in detail supra, can be implemented in the UTRAN 904.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 916 and gateway MSC (GMSC) 918. Packet-switched elements include a serving GPRS support node (SGSN) 920 and gateway GPRS support node (GGSN) 922. Some network elements such as an EIR (equipment identity register) (not shown), HLR (home location register) 924, VLR and AuC (authentication center) (not shown) can be shared by both domains.

A function of the CN 902 is to provide switching, routing and transit for user traffic. The CN 902 also contains the databases and network management functions. The basic CN architecture for UMTS is based on the GSM network with GPRS (general packet radio service) capability. All equipment is modified for UMTS operation and services. The radio access network has several interfaces that can be configured and dimensioned. The CN 906 interfaces to the radio access domain via an Iu interface. An Iu-CS (circuit-switched) reference point interfaces an RNC of the access network to the MSC/VLR entity 916 of the CN 906 for voice from/to the MSC/VLR 916. An Iu-PS (packet-switched) reference point interfaces an RNC of the access network to the SGSN entity 920 of the CN 906 for data from/to the SGSN 920.

In the CN 906, a Gs interface is provided between the MSC/VLR 916 and the SGSN. A Gn interface is provided between the SGSN 920 and the GGSN 922. A D interface is provided between the MSC/VLR 916 and the HLR 924, and the HLR 924 and the GMSC 918. A Gr interface is provided between the SGSN 920 and the HLR 924. A Gc interface is provided between the GGSN 922 and the HLR 924.

The CN 906 provides the interface from the UE domain 902 to external networks 926 such as the Internet 928 via a Gi interface from the GGSN 922, and other networks 930 via the GMSC 918, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 906 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Summarizing the UMTS frequencies, 1920-1980 MHz and 2130-2170 MHz are employed for FDD and WCDMA. Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz are for TDD and TD/CDMA. Unpaired channel spacing can be 5 MHz and raster is 200 kHz. Transmit and receive are not separated in frequency. Frequencies 1980-2010 MHz and 2170-2200 MHz are employed for satellite uplink and downlink.

Figure 10:
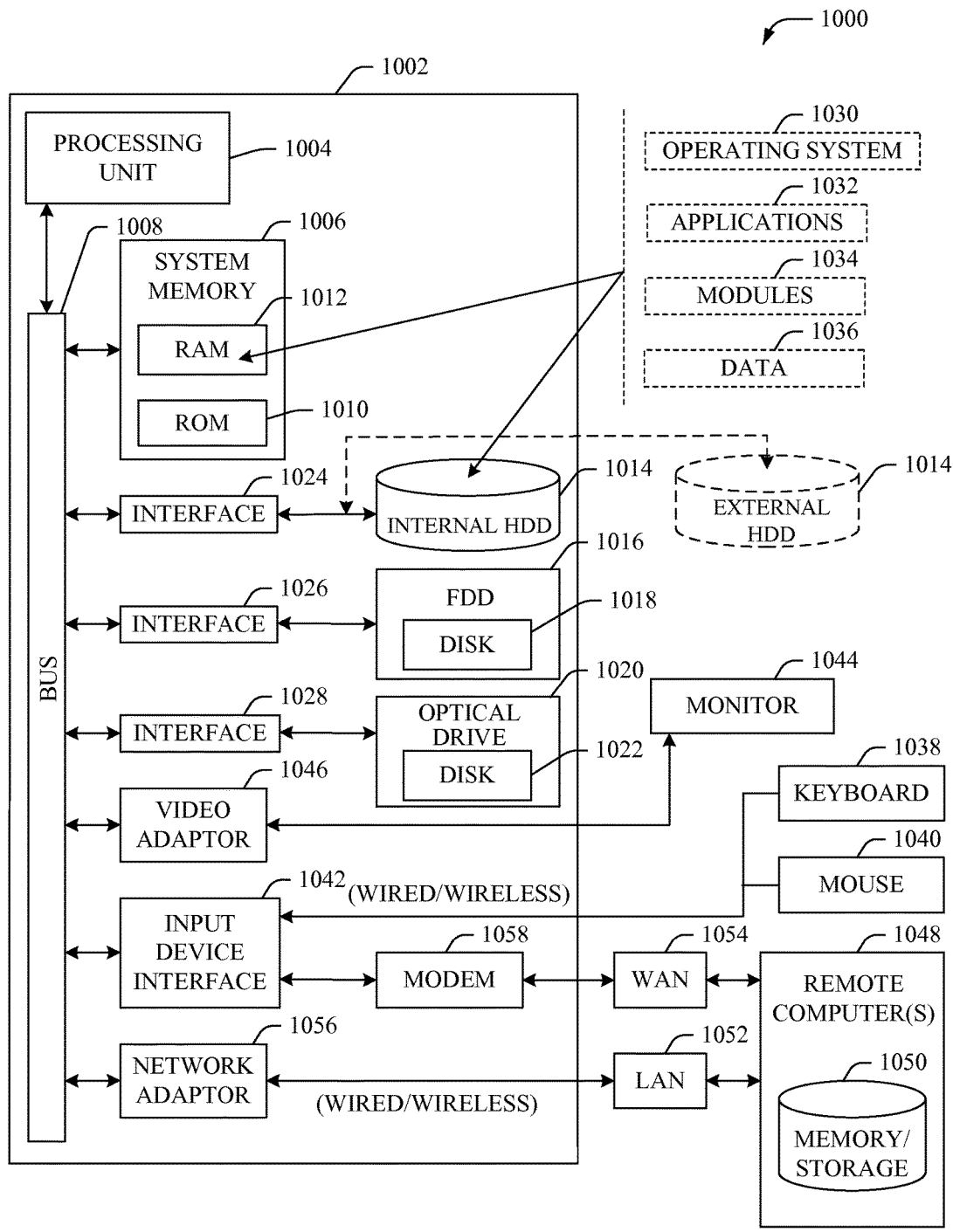
FIG. 10 illustrates a block diagram of a computer operable to execute the disclosed communication architecture.

Referring now to FIG. 10, there is illustrated a block diagram of a computer operable to execute the disclosed communication architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. An apparatus, comprising:
a processor; and
a memory that stores executable instructions that, when executed by the processor, facilitate performance of operations, comprising:
accessing session state information associated with first data sessions between user devices and a network device of a network, wherein the session state information comprises quality of experience data that has been determined based on an aggregation of data obtained via input interfaces of the user devices; and
based on a result generated by analyzing the session state information, updating a network policy associated with a second data session between a user device of the user devices and the network device, wherein the updating the network policy comprises modifying route data to generate an updated route for a transmission of data during the second data session, wherein the updating comprises updating the network policy to facilitate an aggregation of notification data indicative of respective notifications of messages available to the user device, wherein the aggregation of the notification data results in aggregated notification data and wherein the aggregated notification data is directed to the user device based on a condition of the network.

2. The apparatus of claim 1, wherein the first data sessions and the second data session have been assigned a common category.

3. The apparatus of claim 1, wherein the network policy is a first network policy, and wherein the operations further comprise:
creating a second network policy based on the result of the analyzing.

4. The apparatus of claim 1, wherein the accessing comprises accessing at least one of a packet delivery rate or a lost-packet rate associated with a first data session of the first data sessions.

5. The apparatus of claim 1, wherein the accessing comprises accessing resource demand data associated with a first data session of the first data sessions.

6. The apparatus of claim 1, wherein the accessing comprises accessing preference data related to an application associated with the user device.

7. The apparatus of claim 1, wherein the updating comprises updating the network policy to facilitate a delay of a transmission of the aggregated notification data.

8. The apparatus of claim 1, wherein the session state information comprises preference data indicative of a preference associated with the network device.

9. The apparatus of claim 1, wherein the session state information comprises preference data indicative of a preference associated with the user device.

10. The apparatus of claim 1, wherein the updating further comprises updating the network policy to facilitate a periodic transfer of the aggregated notification data.

11. The apparatus of claim 1, wherein the operations further comprise:
facilitating the transmission of the data via the updated route.

12. A method, comprising:
determining, by a system comprising a processor, session state information associated with first data sessions initiated between user equipments and a network device of a network, wherein the session state information comprises quality of experience data that has been determined based on combining user input data received via input interfaces of the user equipments; and
based on a result of analyzing a portion of the session state information, updating, by the system, policy data indicative of a network policy associated with a second data session between a user equipment of the user equipments and the network device, wherein the network policy comprises a routing policy that is employable to determine a route for transferring data associated with the second data session, wherein the updating comprises updating the policy data to facilitate an aggregation of notification data indicative of respective notifications of messages available to the user equipment, wherein the aggregation of the notification data results in aggregated notification data and wherein the aggregated notification data is to be directed to the user equipment based on a condition of the network.

13. The method of claim 12, wherein the determining comprises monitoring a rate of lost packets associated with a first data session of the first data sessions.

14. The method of claim 12, wherein the updating comprises updating the policy data to facilitate delaying a transmission of data associated with a first data session of the first data sessions.

15. The method of claim 14, wherein the delaying comprises delaying the transmission of the data for a defined period.

16. The method of claim 14, wherein the delaying comprises delaying the transmission of the data until an operating mode associated with devices of the network is determined to satisfy an operating mode criterion.

17. The method of claim 14, wherein the delaying comprises delaying the transmission of the data until a defined number of messages for the user equipment are available at a server device of the network.

18. A non-transitory machine readable storage medium, comprising executable instructions that, when executed by a processor, facilitate performance of operations, comprising:

obtaining session state information associated with first data flows between mobile devices and a network device of a communication network, wherein the session state information comprises quality of experience data that has been determined based on aggregating user input data received via input interfaces of the mobile devices;

analyzing the session state information; and based on a result of the analyzing, modifying policy data representing a network policy associated with a second data flow between a mobile device of the mobile devices and the network device, wherein the network policy comprises a routing policy that is employable to determine a path for routing for data associated with the second data flow, wherein the modifying the policy data comprises modifying the policy data to facilitate an aggregation of notification data indicative of respective notifications of messages available to the mobile device, wherein the aggregation of the notification data results in aggregated notification data and wherein the aggregated notification data is directed to the mobile device based on a condition of the communication network.

19. The non-transitory machine readable storage medium of claim 18, wherein the obtaining comprises obtaining the session state information based on bandwidth data indicative of available bandwidth of a communication link of the communication network.

20. The non-transitory machine readable storage medium of claim 18, wherein the mobile device is a first mobile device and the operations further comprise:

synchronizing an update to the session state information between the first mobile device and a second mobile device that generates the update.

* * * * *